United States Patent
Das

(10) Patent No.: US 11,586,844 B2
(45) Date of Patent: Feb. 21, 2023

(54) METHOD AND SYSTEM FOR DETECTING AND TRACKING OBJECTS IN A ROTATIONAL ENVIRONMENT

(71) Applicant: Wipro Limited, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 389 days.

(21) Appl. No.: 16/836,230

(22) Filed: Mar. 31, 2020

(65) Prior Publication Data
US 2021/0303920 A1 Sep. 30, 2021

(30) Foreign Application Priority Data
Mar. 30, 2020 (IN) .............................. 202041013798

(51) Int. Cl.
| | | |
|---|---|---|
| *G06K 9/62* | (2022.01) | |
| *G06N 3/04* | (2006.01) | |
| *G06V 20/40* | (2022.01) | |
| *G06V 20/64* | (2022.01) | |
| *G06V 10/764* | (2022.01) | |
| *G06N 3/08* | (2006.01) | |
| *G06V 10/82* | (2022.01) | |
| *G06V 20/52* | (2022.01) | |
| *G06N 3/084* | (2023.01) | |

(52) U.S. Cl.
CPC ......... *G06K 9/6256* (2013.01); *G06K 9/6232* (2013.01); *G06N 3/04* (2013.01); *G06V 20/40* (2022.01); *G06V 20/647* (2022.01); *G06N 3/084* (2013.01)

(58) Field of Classification Search
None
See application file for complete search history.

(56) References Cited

U.S. PATENT DOCUMENTS

| | | | |
|---|---|---|---|
| 9,536,322 B1 * | 1/2017 | Smith | ........................ G06T 7/11 |
| 11,164,378 B1 * | 11/2021 | Cowen | .................... G01S 13/88 |
| 2018/0114445 A1 * | 4/2018 | Jang | ........................... B60R 1/00 |
| 2018/0239982 A1 | 8/2018 | Rutschman et al. | |

(Continued)

FOREIGN PATENT DOCUMENTS

| | | | |
|---|---|---|---|
| CN | 101408931 B | 2/2013 | |
| CN | 108171749 A * | 6/2018 | .............. B25J 19/00 |

(Continued)

*Primary Examiner* — Mohammed Rachedine
(74) *Attorney, Agent, or Firm* — Finnegan, Henderson, Farabow, Garrett & Dunner, LLP

(57) ABSTRACT

This disclosure relates to method and system for detecting and tracking at least one object in a rotational environment. The method includes receiving a set of first features based on first data and a set of second features based on second data, detecting at least one object based on the set of first features using a Convolutional Neural Network (CNN) based predictive model, determining a set of first parameters for the at least one object, detecting the at least one object based on the set of second features using the CNN based predictive model, determining a set of second parameters for the at least one object, and tracking the at least one object based on the set of first parameters and the set of second parameters. It should be noted that the first data and the second data sequentially belong to an input dataset that includes images or video frames.

20 Claims, 11 Drawing Sheets

(56) References Cited

U.S. PATENT DOCUMENTS

2019/0011530 A1\* 1/2019 Dowski, Jr. ............. G01S 3/784
2020/0025931 A1\* 1/2020 Liang ................... G06K 9/6289
2021/0025975 A1\* 1/2021 Seeber ................... G06T 7/254
2021/0103776 A1\* 4/2021 Jiang ................... G06K 9/6257

FOREIGN PATENT DOCUMENTS

| CN | 106127217 B | | 11/2019 |
|---|---|---|---|
| KR | 962557 B1 | \* | 6/2010 |
| KR | 2016057024 A | \* | 5/2016 |

\* cited by examiner

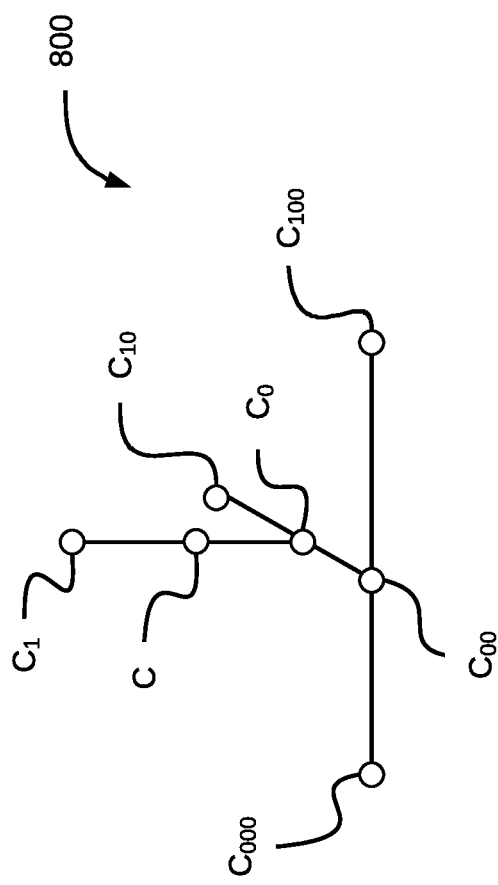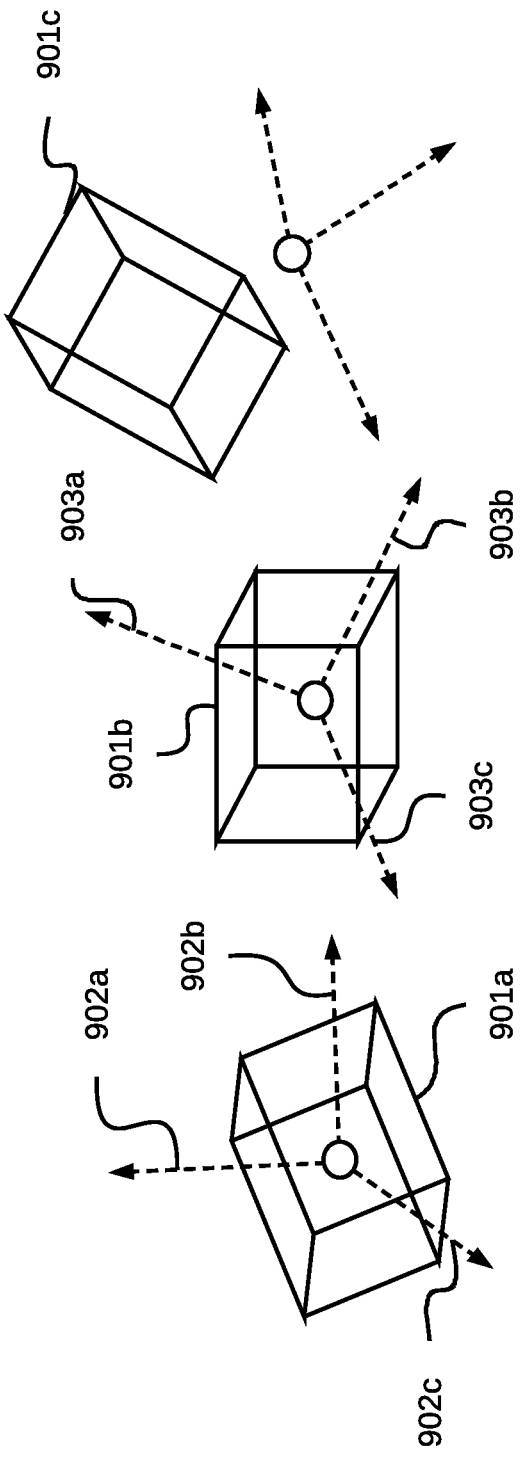
FIG. 8
FIG. 9

| Sign convention 1101 | State 1102 |
|---|---|
| 0 | Undefined state |
| 1 | Same State |
| *1 | Clockwise Rotation |
| %1 | Anticlockwise Rotation |

METHOD AND SYSTEM FOR DETECTING AND TRACKING OBJECTS IN A ROTATIONAL ENVIRONMENT

TECHNICAL FIELD

This disclosure relates generally to computer vision, and more particularly to method and system for detecting and tracking objects in a rotational environment.

BACKGROUND

With every passing day, innovations in the field of computer vision are enhancing its features and usefulness. In the present state of art, several real-world applications exist for computer vision in performing tedious jobs in an easier and faster way. Further, the parallel computation of computer vision helps in addressing complex medical problems as well as the real-time problems in traffic management, autonomous vehicles, and aerial vehicles. However, when an object is in a rotational environment, the conventional computer vision techniques fail in determining object attributes leading to false positive or false negative predictions in a rotational environment. Particularly, when the object is rotating at a high velocity, the images captured for the object may depict the object in a distorted state. The conventional techniques are not capable of detecting distorted objects. Moreover, the conventional mechanisms lack in computing a trajectory for the object at same instance.

In a rotational environment, the object may undergo quick changes in features and attributes. Therefore, if a learning model learns wrong features, the accuracy of prediction and object detection may be decreased. The conventional techniques fail in projecting an image from a spherical signal to a planar signal. Deep learning models based on Convolutional Neural Networks (CNN) are most commonly used methods of computer vision. However, detecting an object in an image with spherical refraction is not possible using conventional CNN techniques.

In short, existing techniques fall short in providing a mechanism for detecting objects in a three-dimensional (3D) rotational environment. Further, existing techniques fail to provide a mechanism for detecting objects in a distorted state using computer vision.

SUMMARY

In one embodiment, a method of detecting and tracking at least one object in a rotational environment is disclosed. In one example, the method may include receiving, by an object detection device, a set of first features based on first data and a set of second features based on second data. The first data and the second data sequentially belong to an input dataset. The input dataset may include at least one of a plurality of images and a plurality of video frames. Further, the method may include detecting, by the object detection device, at least one object based on the set of first features using a Convolutional Neural Network (CNN) based predictive model. The CNN based predictive model may be trained to detect and track an object. Further, the method may include determining, by the object detection device, a set of first parameters for the at least one object. The set of first parameters may include a set of first axes and a first lattice point for each of the set of first axes. The set of first axes may include at least one of a first x-axis, a first y-axis, and a first z-axis. Further, the method may include detecting, by the object detection device, the at least one object based on the set of second features using the CNN based predictive model. Further, the method may include determining, by the object detection device, a set of second parameters for the at least one object. The set of second parameters may include a set of second axes and a second lattice point for each of the set of second axes, and wherein the set of second axes may include at least one of a second x-axis, a second y-axis, and a second z-axis. Further, the method may include tracking, by the object detection device, the at least one object based on the set of first parameters and the set of second parameters.

In one embodiment, a system for detecting and tracking at least one object in a rotational environment is disclosed. In one example, the system may include a processor and a computer-readable medium communicatively coupled to the processor. The computer-readable medium may store processor-executable instructions, which, on execution, may cause the processor to receive a set of first features based on first data and a set of second features based on second data. The first data and the second data sequentially belong to an input dataset. The input dataset may include at least one of a plurality of images and a plurality of video frames. The processor-executable instructions, on execution, may further cause the processor to detect at least one object based on the set of first features using a CNN based predictive model. The CNN based predictive model may be trained to detect and track an object. The processor-executable instructions, on execution, may further cause the processor to determine a set of first parameters for the at least one object. The set of first parameters may include a set of first axes and a first lattice point for each of the set of first axes. The set of first axes may include at least one of a first x-axis, a first y-axis, and a first z-axis. The processor-executable instructions, on execution, may further cause the processor to detect the at least one object based on the set of second features using the CNN based predictive model. The processor-executable instructions, on execution, may further cause the processor to determine a set of second parameters for the at least one object. The set of second parameters may include a set of second axes and a second lattice point for each of the set of second axes. The set of second axes may include at least one of a second x-axis, a second y-axis, and a second z-axis. The processor-executable instructions, on execution, may further cause the processor to track the at least one object based on the set of first parameters and the set of second parameters.

In one embodiment, a non-transitory computer-readable medium storing computer-executable instructions for detecting and tracking at least one object in a rotational environment is disclosed. In one example, the stored instructions, when executed by a processor, may cause the processor to perform operations including receiving a set of first features based on first data and a set of second features based on second data. The first data and the second data sequentially belong to an input dataset. The input dataset may include at least one of a plurality of images and a plurality of video frames. The operations may further include detecting at least one object based on the set of first features using a CNN based predictive model. The CNN based predictive model may be trained to detect and track an object. The operations may further include determining a set of first parameters for the at least one object. The set of first parameters may include a set of first axes and a first lattice point for each of the set of first axes. The set of first axes may include at least one of a first x-axis, a first y-axis, and a first z-axis. The operations may further include detecting, by the object detection device, the at least one object based on the set of second features using the CNN based predictive model. The operations may further include determining, by the object detection device, a set of second parameters for the at least one object. The set of second parameters may include a set of second axes and a second lattice point for each of the set of second axes, and wherein the set of second axes may include at least one of a second x-axis, a second y-axis, and a second z-axis. The operations may further include tracking, by the object detection device, the at least one object based on the set of first parameters and the set of second parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 illustrates determination of a slope for each of the set of axes based on a present lattice point, a past lattice point, and a new lattice point of an object, in accordance with some embodiments of the present disclosure.

FIG. 9 illustrates determination of a difference in each of a set of axes of an object between an input image and a historical image, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
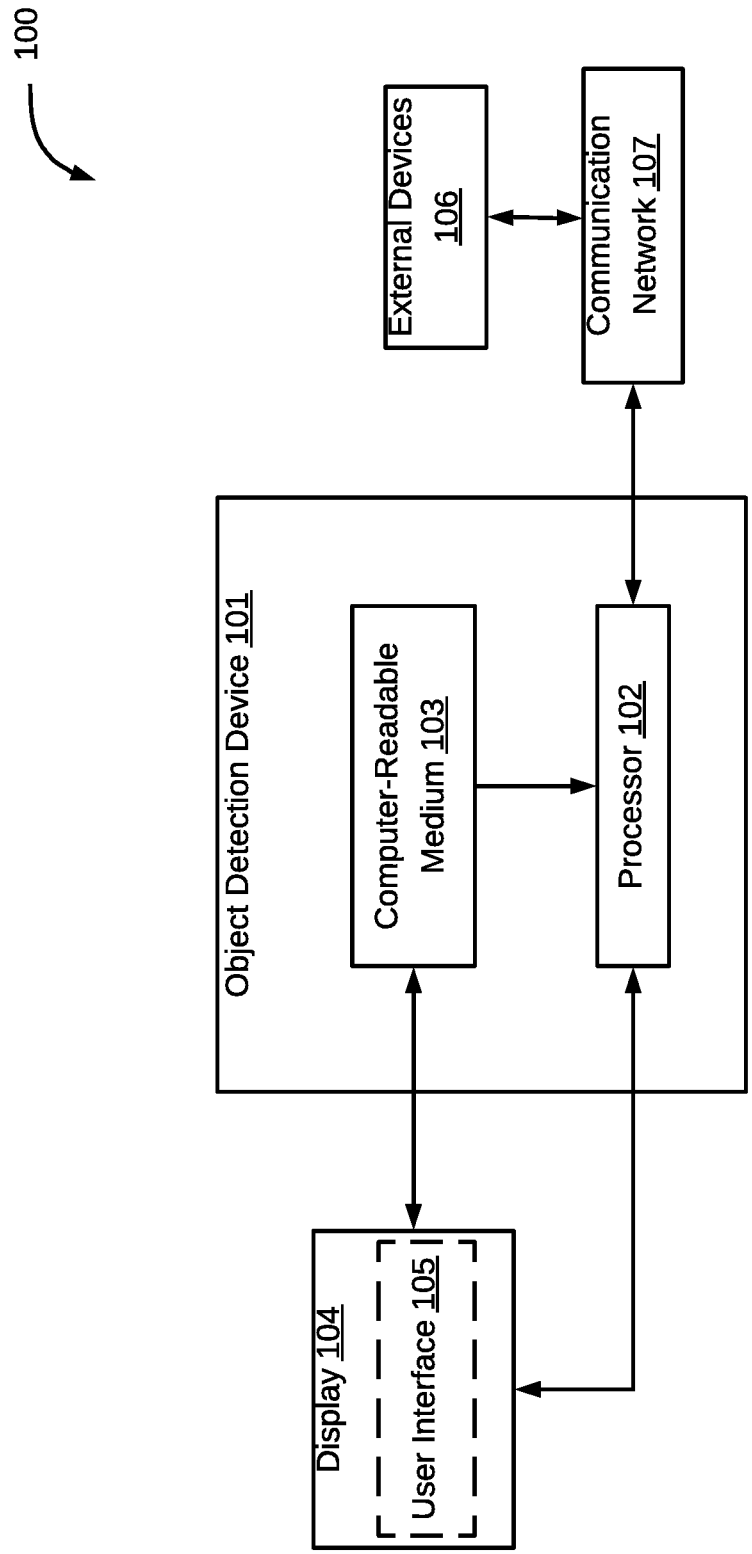
FIG. 1 is a block diagram of an exemplary system for detecting and tracking at least one object in a rotational environment, in accordance with some embodiments of the present disclosure.

Referring now to FIG. 1, an exemplary system 100 for detecting and tracking at least one object in a rotational environment is illustrated, in accordance with some embodiments of the present disclosure. In particular, the system 100 may include an object detection device 101 that may detect and track the at least one object in the rotational environment, in accordance with some embodiments of the present disclosure. The object detection device 101 may detect and track the at least one object using Convolutional Neural Network (CNN). It should be noted that, in some embodiments, the object detection device 101 may determine a set of first parameters for an input image and a set of second parameters for a historical image to detect and track the at least one object in the rotational environment.

As will be described in greater detail in conjunction with FIGS. 2-11, the object detection device 101 may receive a set of first features based on first data and a set of second features based on second data. It may be noted that the first data and the second data belong to an input dataset. The object detection device 101 may further detect at least one object based on the set of first features through a CNN based predictive model. The object detection device 101 may further determine a set of first parameters for the at least one object. It may be noted that the set of first parameters may include a set of first axes and a first lattice point for each of the set of first axes. It may also be noted that the set of first axes may include at least one of a first x-axis, a first y-axis, and a first z-axis. The object detection device 101 may further detect the at least one object based on the set of second features through the CNN based predictive model. The object detection device 101 may further determine a set of second parameters for the at least one object. It may be noted that the set of second parameters may include a set of second axes and a second lattice point for each of the set of second axes. It may be noted that the set of second axes may include at least one of a second x-axis, a second y-axis, and a second z-axis. The object detection device 101 may further track the at least one object based on the set of first parameters and the set of second parameters.

The object detection device 101 may take the form of any computing device including, but not limited to, a server, a desktop, a laptop, a notebook, a netbook, a tablet, a smartphone, and a mobile phone. In some embodiments, the object detection device 101 may include one or more processors 102 and a computer-readable medium 103 (for example, a memory). The computer-readable medium 103 may include a predictive model (based on CNN) which may generate an output (e.g. a set of features) for an input data (e.g. image, video, pixels, etc.). Further, the computer-readable storage medium 103 may store instructions that, when executed by the one or more processors 102, cause the one or more processors 102 to detect the at least one object in a rotational environment and determine a trajectory of the at least one object through interpolation, in accordance with aspects of the present disclosure. The computer-readable storage medium 103 may also store various data (for example, input image data, historical image data, the CNN based predictive model, the set of features, a set of parameters for each of the input image data and the historical image data, and the like) that may be captured, processed, and/or required by the system 100.

The system 100 may further include a display 104. The system 100 may interact with a user via a user interface 105 accessible via the display 104. The system 100 may also include one or more external devices 106. In some embodiments, the object detection device 101 may interact with the one or more external devices 106 over a communication network 107 for sending or receiving various data. The external devices 106 may include, but may not be limited to, a remote server, a digital device, or another computing system.

Figure 2:
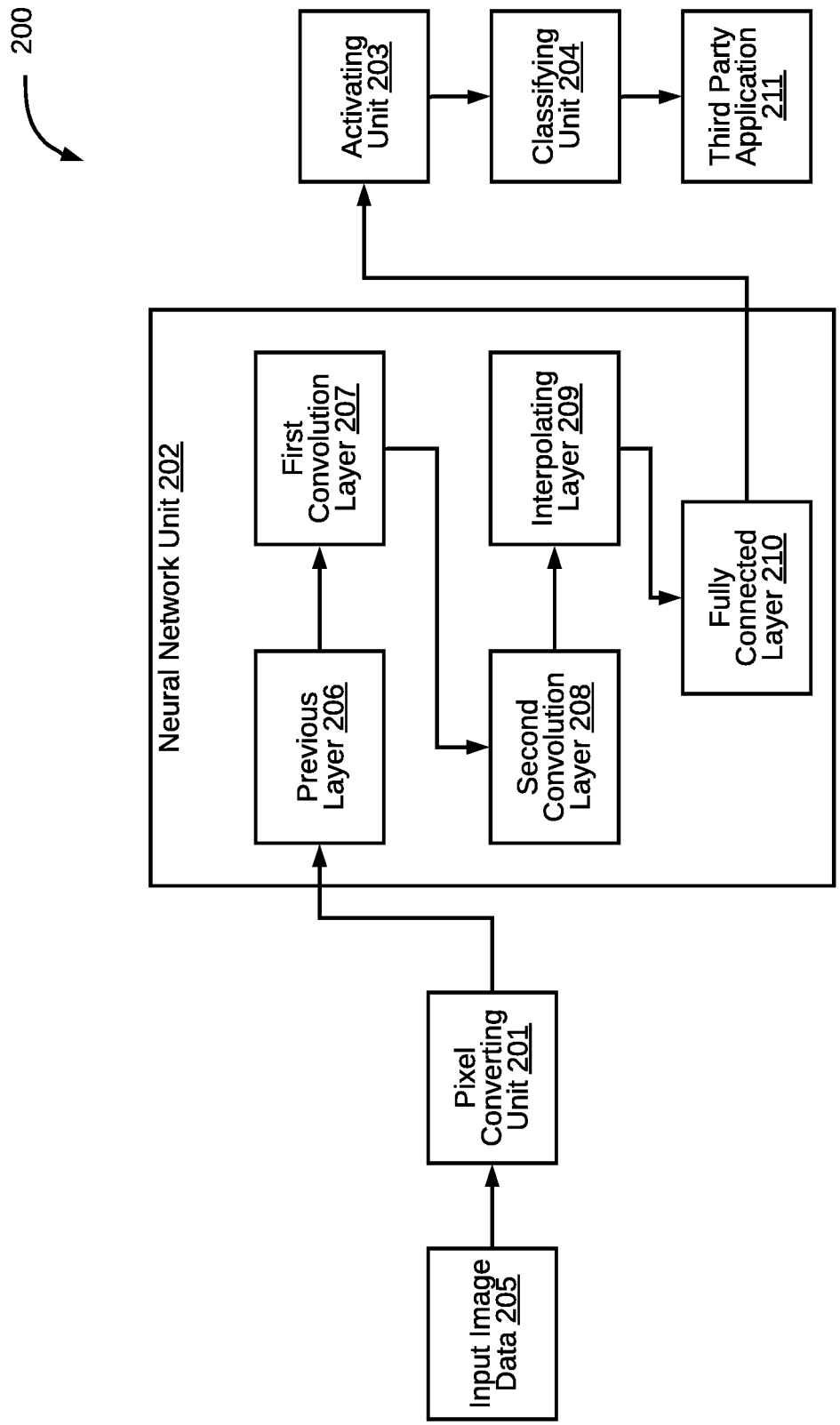
FIG. 2 is a functional block diagram of an object detection device implemented by the exemplary system of FIG. 1, in accordance with some embodiments of the present disclosure.

Referring now to FIG. 2, a functional block diagram of an object detection device 200 (analogous to the object detection device 101 implemented by the system 100) is illustrated, in accordance with some embodiments of the present disclosure. The object detection device 200 may include a pixel converting unit 201, a neural network unit 202, an activating unit 203, and a classifying unit 204. The pixel converting unit 201 may receive input image data 205. By way of an example, the input image data 205 may include a plurality of images or a video captured by an image-capturing device or any other multimedia devices. In case the input image data 205 includes a video, each of a plurality of frames of the video may be converted into an image in order to obtain a plurality of images. Further, the pixel converting unit 201 may convert each of the plurality of images into a plurality of pixels. In some embodiments, the pixel converting unit 201 may perform synchronization of the plurality of pixels corresponding to each of the plurality of images. It may be noted that the pixel converting unit 201 may extract Red-Green-Blue (R-G-B) color values from each of the plurality of pixels and reshape into standard form in order to maintain synchronization. Further, the pixel converting unit 201 may remove noise (for example, unwanted filters and distortions) from the input image data 205 using Gaussian smoothing. Further, the pixel converting unit 201 may determine layers of each of the plurality of images based on background and foreground objects using segmentation and morphology techniques. It may be noted that determination of layers may reduce the noise from the input image data 205 and eliminate errors. In some embodiments, the pixel converting unit 201 may extract a set of primary features from the input image data 205. Further, the pixel-converting unit 201 may send the plurality of pixels of each of the plurality of images to the neural network unit 202.

The neural network 202 may include a previous layer 206, a first convolution layer 207, a second convolution layer 208, an interpolating layer 209, and a fully connected layer 210. The previous layer 206 may receive the plurality of pixels of the plurality of images from the pixel converting unit 201. In some embodiments, the previous layer 206 may store a set of historic weights corresponding to each of the historical image data. Further, the previous layer 206 may receive a set of weights of the input image data 205 for each of a plurality of training cycles of the neural network unit 202. In some embodiments, the previous layer 206 may send the set of weights to the activating unit 203 in order to compute an activation function. It may be noted that the set of historic weights may be combined with the set of weights corresponding to the input image data 205. Further, the set of historic weights may be calibrated with the set of weights based on the set of features corresponding to the at least one object to obtain an updated weight matrix. Further, the previous layer 206 may send the set of weights and the plurality of pixels of the input image data 205 to the first convolution layer 207.

In some embodiments, the first convolution layer 207 may further include a plurality of secondary convolution layers. In such embodiments, architecture of the first convolution layer 207 may be based upon an end user requirement. It may be noted that the first convolution layer 207 may include multiple platforms and multiple architecture for computing. Further, the first convolution layer 207 may multiply a kernel filter, a receptor field matrix, or a convolution filter with the plurality of pixels provided by the pixel converting unit 201. It may be noted that the filter may be default or derived from the previous layer 206. In an embodiment, the first convolution layer 207 may apply max pooling technique to define composite pixels for reducing dimensions of the neural network unit 202. Further, the first convolution layer 207 may reduce training time, overfitting of data, and computation throttle. In some embodiments, the first convolution layer 207 may reduce an increment of feature size using padding technique. It may be noted that the above-mentioned techniques may also be used in the second convolution layers 208. In some embodiments, the convoluted filter of the first convolution layer 207 may determine a dynamic state in the environment. Further, the first convolution layer 207 may correct the dynamic state by a final filter and an activation function. As will be appreciated, a plurality of sub-layers, each based on CNN, may be used in the first convolution layer 207 and may vary in number based on user requirements and use-case scenarios. The first convolution layer 207 may extract a set of first features from the input image data 205 and a set of second features from historical dataset. Further, the first convolution layer 207 may send the plurality of pixels of the input image data 205 and the historical image data along with the corresponding set of first features and the set of second features to the second convolution layer 208.

In an embodiment, the second convolution layer 208 may be identical in composition to the first convolution layer 207. However, input data may be different for the first convolution layer 207 and the second convolution layer 208. The second convolution layer 208 may map the set of first features of the input image data 205 with the set of second features of the historical image data. Further, the second convolution layer 208 may include a plurality of sub-layers to extract a set of sub-features for the input image data 205. Further, the second convolution layer 208 may include a combination of the set of weights with the set of first features and the set of second features. Further, the second convolution layer 208 may send the set of sub-features to the interpolating layer 209.

The interpolating layer 209 may compute an interpolation and detect a trajectory for the at least one object from the input image data 205 and the historical image data. In some embodiments, the interpolating layer 209 may perform backpropagation of the trajectory. Further, the interpolating layer 209 may detect an environment state while performing the interpolation. It may be noted that the interpolating layer 209 may determine a set of first parameters and a set of second parameters for the at least one object from the input image data 205 and the historical image data, respectively.

Figure 3:
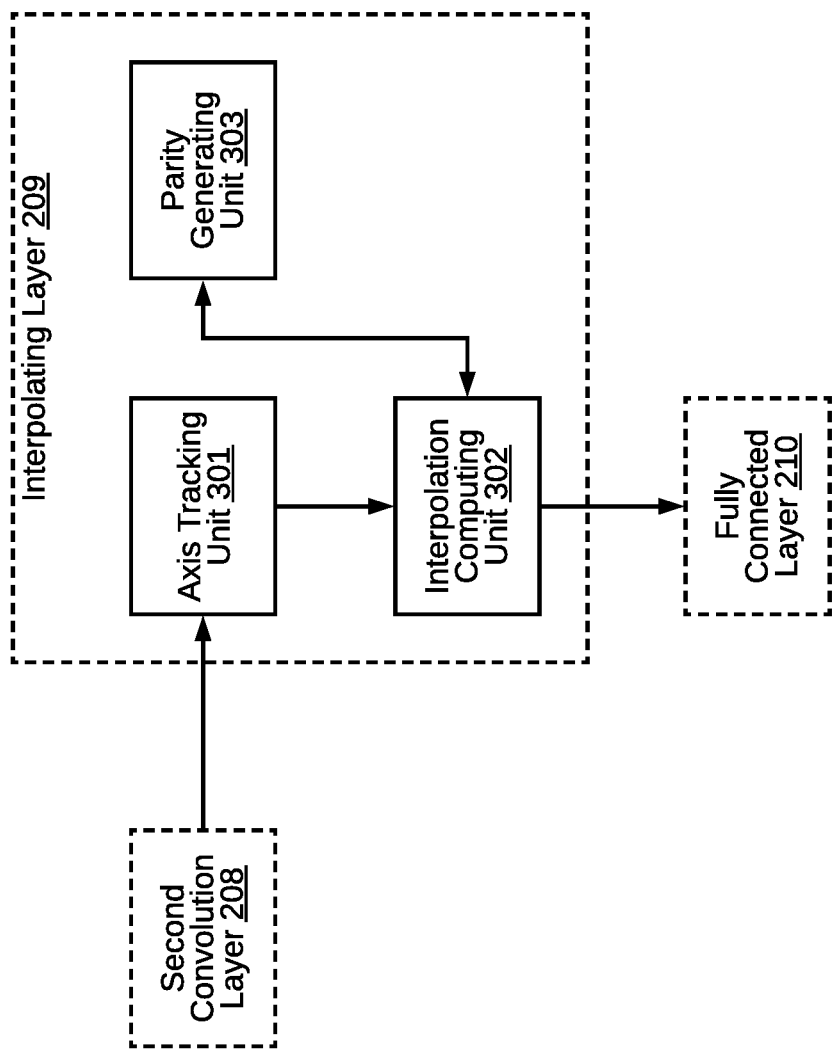
FIG. 3 is a block diagram of an interpolating layer configured to detect and track at least one object in a rotational environment, in accordance with some embodiments of the present disclosure.

This is explained in detail in conjunction with FIG. 3. The fully connected layer 210 may receive an output from each of the previous layer 206, the first convolution layer 207, the second convolution layer 208, and the interpolating layer 209 and compile the outputs into an integrated output. In an embodiment, the fully connected layer 210 may be a kernel for providing the set of first parameters, the set of second parameters, and motion values for the at least one object along with the set of weights as an output. In another embodiment, the fully connected layer 210 may combine the set of primary features, the set of first features, the set of second features, and the set of sub-features to form a feature matrix. Further, the fully connected layer 210 may be connected to the activating unit 203. It may be noted that the fully connected layer 210 may be second most time consuming layer after the first convolution layer 207.

The activating unit 203 may receive the set of weights from the previous layer 206. Further, the activating unit 203 may determine an activation function based on the set of weights. It may be noted that the activation function may consider interaction effects in a set of parameters and may perform a transformation to decide if a neuron may send a computed value to a next layer. As will be appreciated, there is a wide array of activation functions based upon end user goals and objectives of a neural network. As will also be appreciated, the activation function helps in activating neurons based on the associated set of weights of the neurons. In some embodiments, the set of weights may be computed in the first convolution layer 207 with high confidence and trained checkpoint and the input image data 205. Further, the activating unit 203 may send the set of weights to the classifying unit 204 for selecting a correct dataset.

The classifying unit 204 may classify the activated neurons based on the set of weights. In some embodiments, the classifying unit 204 may be within the fully connected layer 210 in order to fine-tune a weighted dataset prior to activating neurons. Further, the classifying unit 204 may perform a post neuron classification when a complexity of prediction may increase, or under unsupervised conditions. It may be noted that the classifying unit 204 is based upon the user requirements and may not have a dependency in computations of a neuron until the neuron is beyond activation. In some embodiments, the weighted neurons may be classified based upon a predefined condition when classification is performed before activation. In such embodiments, the classifying unit 204 may select neurons to be activated by the activating unit 203. Further, the classifying unit 204 may send prediction results to a third party application 211. The third party application 211 may receive Machine Learning (ML) as a service through communication with an Application Programming Interface (API) or direct integration. Further, the third party application 211 may provide the input image data 205 and obtain a prediction of the at least one object. It may be noted that the data may be communicated through a User Interface (UI) and a common format, by a front-end or a back-end application module. In an embodiment, the output may be used in JSON format with a real time application.

It should be noted that all such aforementioned modules 201-211 may be represented as a single module or a combination of different modules. Further, as will be appreciated by those skilled in the art, each of the modules 201-21 may reside, in whole or in parts, on one device or multiple devices in communication with each other. In some embodiments, each of the modules 201-211 may be implemented as dedicated hardware circuit comprising custom application-specific integrated circuit (ASIC) or gate arrays, off-the-shelf semiconductors such as logic chips, transistors, or other discrete components. Each of the modules 201-211 may also be implemented in a programmable hardware device such as a field programmable gate array (FPGA), programmable array logic, programmable logic device, and so forth. Alternatively, each of the modules 201-211 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for detecting and tracking at least one object in a rotational environment. For example, the exemplary system 100 and the associated object detection device 101, 200 may detect and track the at least one object in a rotational environment by the processes discussed herein. In particular, as will be appreciated by those of ordinary skill in the art, control logic and/or automated routines for performing the techniques and steps described herein may be implemented by the system 100 and the associated object detection device 101, 200 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Referring now to FIG. 3, the interpolating layer 209 configured to detect and track at least one object in a rotational environment is illustrated, in accordance with some embodiments of the present disclosure. The interpolating layer 209 may include an axis tracking unit 301, an interpolation computation unit 302, and a parity generating unit 303. The axis tracking unit 301 may receive the set of sub-features from the second convolution layer 208. Further, the axis tracking unit 301 may receive the at least one object in the input image data 205 and the corresponding set of first features and the set of sub-features from the first convolution layer 207 and the second convolution layer 208. In some embodiments, the axis tracking unit 301 may be configured to track the set of axes of the at least one object as well as an associated environment of the at least one object to determine a rotational effect of the input image data 205. It may be noted that the set of axes may be computed in a three-dimensional (3D) Euclidean space of the input image data 205. In other words, the set of axes may include an axis of rotation of the at least one object about each of an x-axis, a y-axis, and a z-axis.

Each of the set of axes may be used to determine a rotation group. Therefore, the rotation group may include rotations about each of the set of axes in the 3D Euclidean space under functional composition. Further, the Euclidean space may be considered where a rotational effect in the at least one object is negligible and is a non-negative value. It may be noted that the rotation group may also be known as SO (3) (Special Orthogonal (3D axis)). The axis of rotation of the at least one object may be calculated based on Euler's rotation theorem. In some embodiments, a rotation may be classified based on odd dimension or even dimension. By way of an example, the odd dimension may be represented as ($O_n$) and the even dimension may also be represented as ($E_n$). It may be noted that the "n" value changes when dimensional axis changes. The Euler's rotation theorem may include calculating the rotation group by multiplying a rotation matrix with each of the set of axes of the at least one object to determine positional changes of each of the set of axes. The axis-tracking unit 301 may be configured to determine a planar axis of each dimension in a 3D space and send the set of axes to the interpolation computation unit 302.

The interpolation computation unit 302 may determine an effect of rotation leading to a second state of the at least one object from a first state. Further, the interpolation computation unit 302 may determine the trajectory of the at least one object in the rotational movement. The interpolation computation unit 302 may further use a trilinear or bilinear interpolation technique to determine the trajectory of the at least one object. It may be noted that the interpolation computation unit 302 may determine the interpolation based on each of the set of axes calculated through the rotation group by the axis tracking unit 301. Further, the interpolation computation unit 302, over a time interval, may determine the trajectory of the at least one object based on a change in a lattice point of the at least one object. This is further explained in detail in conjunction with FIG. 8. The interpolation computation unit 302 may send the interpolation to the fully connected layer 210.

Further, the interpolation computation unit 302 may send the trajectory as an input to the parity generating unit 303. The parity generating unit 303 may compute backtracking. Further, the parity generating unit 303 may generate a parity, to backtrack the at least one object in the rotational environment. In some embodiments, the parity generating unit 303 may act as an object axis correction code. It may be noted that the parity may be computed based upon the trajectory of the at least one object in the input image data 205 and the at least one object in a historical image data. It may also be noted that the parity remains same when the axis of the at least one object is trackable or available in the image space. Therefore, changes in the axis of the at least one object may lead to changes in parity. In a speedy environment, the parity may be used to backtrack the at least one object using the trajectory when the at least one object is untraceable. Further, the parity generating unit 303 may send the parity of the trajectory of the at least one object to the interpolation computing unit 302.

Figure 4A:
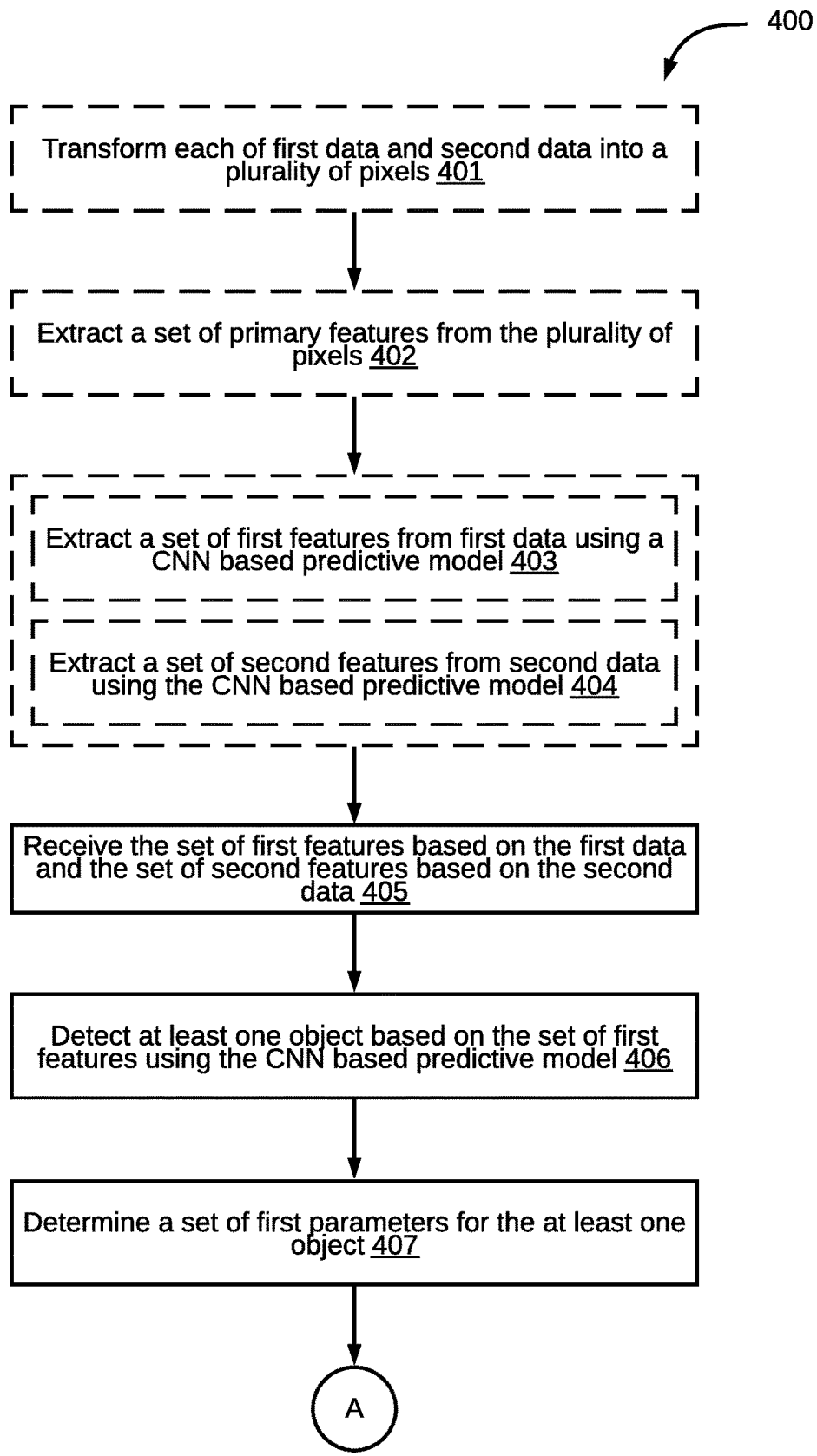
FIGS. 4A and 4B illustrate a flow diagram of an exemplary process for detecting at least one object in a rotational environment, in accordance with some embodiments of the present disclosure.
Figure 4B:
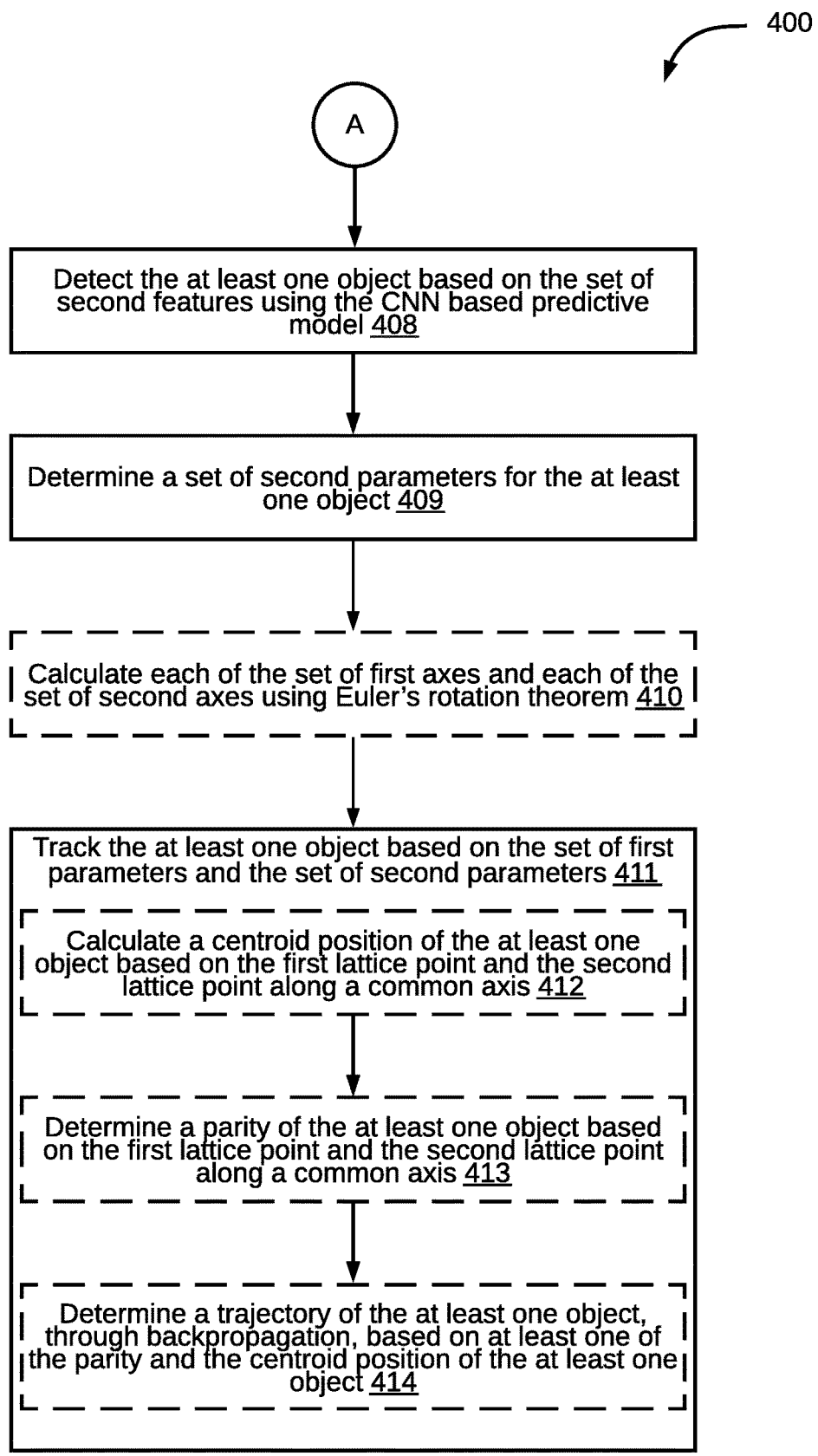

Referring now to FIGS. 4A and 4B, an exemplary process 400 for detecting at least one object in a rotational environment is illustrated via a flow chart, in accordance with some embodiments of the present disclosure. The process 400 may include transforming each of first data and second data into a plurality of pixels, at step 401. The first data and the second data sequentially belong to an input dataset. For example, in some embodiments, the first data may include current image data (for example, from the input image dataset 205), while the second data may include historical image data (for example, from previously fed image dataset). It may be noted that the input dataset may include at least one of a plurality of images and a plurality of video frames. Further, the process 400 may include extracting a set of primary features from the plurality of pixels, at step 402. In an embodiment, the set of primary features may be extracted by the pixel converting unit 201. Further, the set of primary features may be stored in the previous layer 206.

Further, the process 400 may include extracting the set of first features from the first data using a CNN based predictive model, at step 403. It may be noted that the CNN based predictive model is trained to detect and track an object. Further, at step 404, the set of second features may be extracted from the second data using the CNN based predictive model. It may be noted that the set of first features and the set of second features may be convoluted features. In some embodiments, the set of second features corresponding to the historical image data may be stored in the previous layer 206. Further, the process 400 may include receiving the set of first features based on the first data and the set of second features based on the second data, at step 405. At step 406, the object detection device 101 may detect at least one object based on the set of first features using the CNN based predictive model. Further, at step 407, a set of first parameters may be determined for the at least one object. It may be noted that the set of first parameters may include a set of first axes and a first lattice point for each of the set of first axes. It may also be noted that the set of first axes may include at least one of a first x-axis, a first y-axis, and a first z-axis. In an embodiment, the set of first parameters may be determined by the interpolating layer 209 based on the set of first features obtained from the first convolution layer 207.

Further, the process 400 may include detecting the at least one object based on the set of second features using the CNN based predictive model, at step 408. At step 409, a set of second parameters may be determined for the at least one object. It may be noted that the set of second parameters may include a set of second axes and a second lattice point for each of the set of second axes. It may also be noted that the set of second axes may include at least one of a second x-axis, a second y-axis, and a second z-axis. In an embodiment, the set of second parameters may be determined by the interpolating layer 209 based on the set of second features obtained from the first convolution layer 207. Further, the process 400 may include calculating each of the set of first axes and each of the set of second axes using Euler's rotation theorem, at step 410. It may be noted that the Euler's rotation theorem may include multiplying a first rotation matrix of the at least one object with each of the set of first axes and multiplying a second rotation matrix of the at least one object with each of the set of second axes.

Further, the process 400 may include tracking the at least one object based on the set of first parameters and the set of second parameters, at step 411. Further, the step 411 may include calculating a centroid position of the at least one object based on the first lattice point and the second lattice point along a common axis, at step 412. It may be noted that the centroid position is an interpolation of the at least one object between the first lattice point and the second lattice point. Further, the step 411 may include, determining a parity of the at least one object based on the first lattice point and the second lattice point along a common axis, at step 413. Further, the step 411 may include determining a trajectory of the at least one object through backpropagation, based on at least one of the parity and the centroid position of the at least one object, at step 414.

Figure 5:
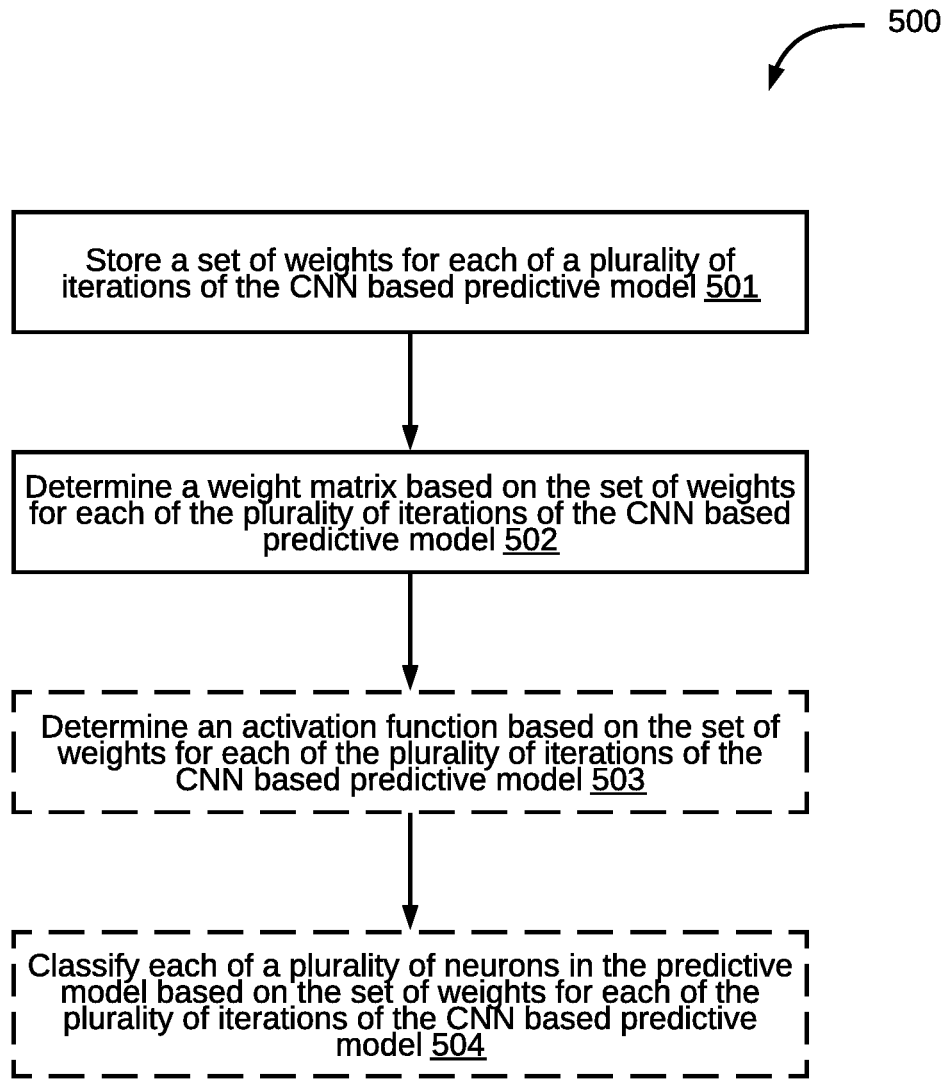
FIG. 5 is a flow diagram of an exemplary process for determining a weight matrix based on a set of weights for each of a plurality of training cycles of a CNN based predictive model, in accordance with some embodiments of the present disclosure.

Referring now to FIG. 5, an exemplary process 500 for determining a weight matrix based on a set of weights for each of a plurality of training cycles of the CNN based predictive model is depicted via a flow chart, in accordance with some embodiments of the present disclosure. The process 500 may include storing a set of weights for each of a plurality of iterations of the CNN based predictive model, at step 501. In an embodiment, the set of weights may be stored in the previous layer 206. Further, the process 500 may include determining a weight matrix based on the set of weights for each of the plurality of iterations of the CNN based predictive model, at step 502. Further, the process 500 may include determining an activation function based on the set of weights for each of the plurality of iterations of the CNN based predictive model, at step 503. In an embodiment, the step 503 may be performed by the activating unit 203. Further, the process 500 may include classifying each of a plurality of neurons in the CNN based predictive model based on the set of weights for each of the plurality iterations of the CNN based predictive model, at step 504. In an embodiment, the step 504 may be performed by the classifying unit 204.

Figure 6:
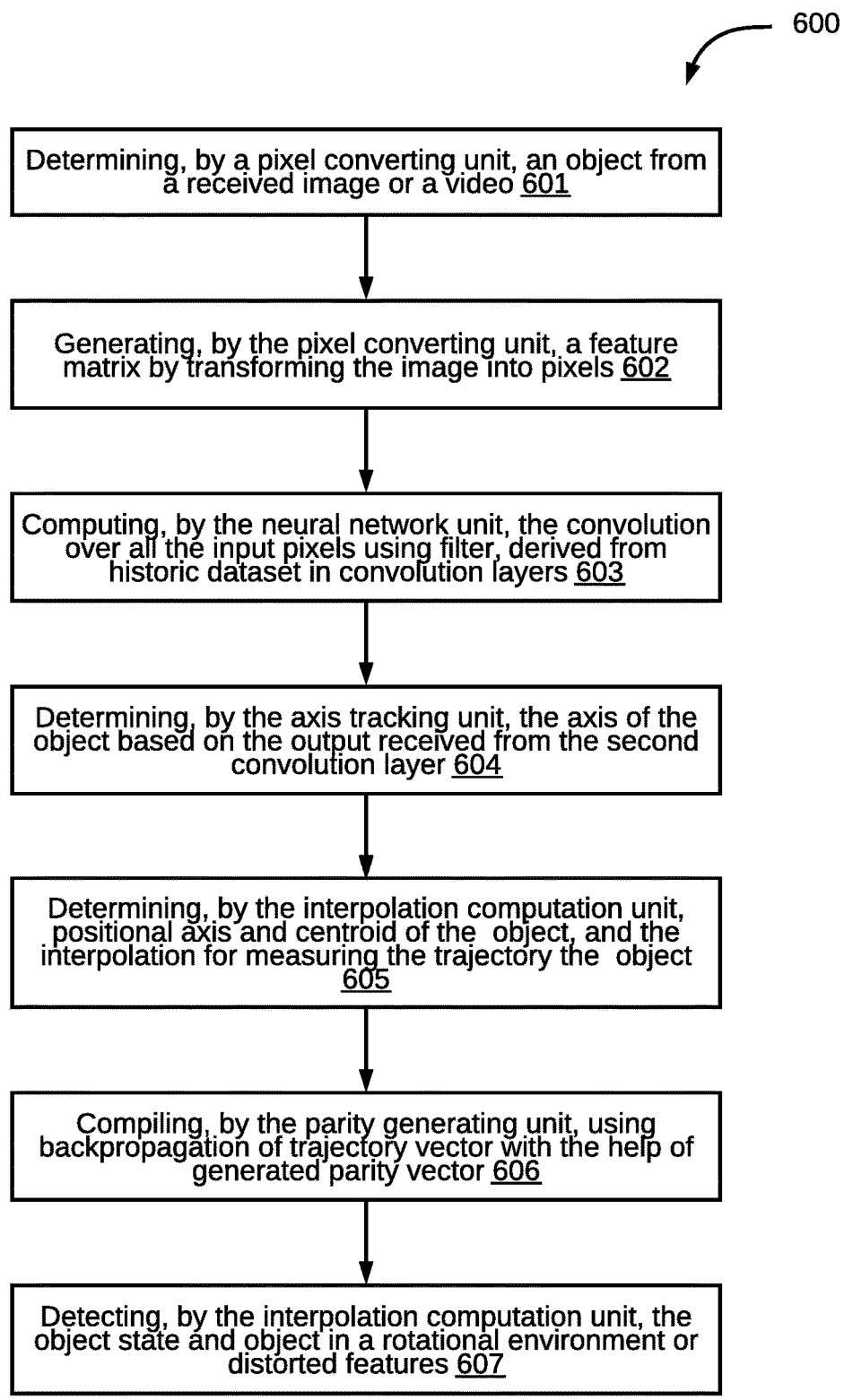
FIG. 6 is a flow diagram of a detailed exemplary process for detecting at least one object in a rotational environment, in accordance with some embodiments of the present disclosure.

Referring now to FIG. 6, a detailed exemplary process 600 for detecting at least one object in a rotational environment, in accordance with some embodiments of the present disclosure. The process 600 may include determining, by the pixel converting unit 201, an object from a received image or a video, at step 601. The image or video may be provided as an input to the pixel converting unit 201. In an embodiment, image dataset may be obtained from a plurality of sources and provided as the input to the pixel converting unit 201. Each image in the image dataset may be directly embedded in an application. It may be noted that the application may communicate with the neural network unit 202 to predict and estimate objects and the trajectory of each of the objects. In an embodiment, a similar architecture may be used in a cloud-based environment to communicate the image or video between both applications through the API. Further, the image or video may be hashed and sent to the pixel converting unit 201 for processing. In an embodiment, a prediction output may become a key to an input hash. As will be appreciated by a person skilled in the art, the object detection device 200 may perform multiple operations of estimation and prediction on multiple categories of data in a single instance of time through hashed images.

Further, the key may be further communicated to the third party application 211 for storage and reuse. It may be noted that a connection between the pixel converting unit 201 and the previous layer 206 may be established by employing connection protocols using standard data connections means such as wireless or wired connections. By way of an example, the connection protocols may include Serial Advanced Technology Attachment (SATA), Integrated Drive Electronics (IDE), IEEE-1394, Universal Serial Bus (USB), API connect or communication between APIs, fiber channel, Small Computer Systems Interface (SCSI), STD Bus, RS-232, RS-422, RS-485, 12C, SPI, Microwire, 1-Wire, IEEE 1284, Intel QuickPathInterconnect, Infini-Band, PCIe, etc. Further, the process 600 may include generating, by the pixel converting unit 201, a feature matrix by transforming the image or video into pixels. It may be noted that the image or video may be received as the input (for example, the input image data 205) by the pixel converting unit 201. Further, the pixel converting unit 201 may transform each image of the input image data 205 into a plurality of pixels.

In an embodiment, a video in the input image data 205 may be transformed into a plurality of images based on a plurality of video frames. Further, the plurality of images may be converted into the plurality of pixels. Further, the plurality of pixels may be generalized based upon quality. It may be noted that the plurality of pixels may be tuned to fine quality prior to processing through the first convolution layer 207. Further, the convolution layer 207 may determine a set of first features from the input image data 205. The set of first features may be multiplied with a feature matrix provided by the previous layer 206. It may be noted that a set of second features based on the historical image data may be pre-trained by a convolution layer. As will be appreciated, using a previous layer filter may enhance prediction results. Further, an updated feature matrix may be obtained, known as a convoluted matrix. Further, the pixel converting unit 201 may process the input image data 205 through a plurality of convolution sub-layers.

Further, the process 600 may include computing, by the neural network unit 202, the convolution over all the input pixels using filter, derived from historic dataset in convolution layers, at step 603. In an embodiment, the neural network unit 202 may include a plurality of convolution layers and a plurality of layers of activated neurons. It may be noted that the plurality of convolution layers and the plurality of layers of activated neurons are designed based on end goal objectives. Therefore, the neural network unit 202 may include a plurality of convolution layers additional to the first convolution layer 207 and the second convolution layer 208. It may be noted that convolution may be performed in many ways such as striding, padding, pooling, and using additional convolution layers. Striding may be performed across the plurality of pixels with the feature matrix to obtain the convoluted matrix. In some exemplary scenarios, the convoluted matrix may further undergo padding and striding effect. In such scenarios, in order to reduce effects of pixel enlargement, pooling may be performed by considering dominant pixels and categories to reduce overall dimension of the input image data 205. It may be noted that by using the previous layer 206, the plurality of pixels is trained and the effect of training across a plurality of image categories may be combined. Further, using the previous layer 206, cross training of image may be performed to obtain a higher amount of training set, helping intelligence growth in the first convolution layer 207, the second convolution layer 208, or both.

Further, the convoluted pixels in a form of the set of first features and the set of second features may be sent to the interpolating layer 209 to determine object orientation, rotational effect, mismatching objects, distorted objects, etc. As will be appreciated, the above-mentioned parameters are generalized environmental effects and may not be solved through the convolution. Therefore, the convoluted pixels are sent to the interpolating layer 209 for computation and error corrections. Further, the process 600 may include determining, by an axis tracking unit 301, the axis of the object based on the output received from the second convolution layer 208, at step 604. As will be appreciated, conventional techniques to determine axis of the object exist in the present state of art. The axis tracking unit 301 may handle the set of axes of the object, generate the interpolation and the parity (for backpropagating to a previous state of the object), and detect the object. Further, the axis tracking unit 301 may revert the object to a current state for labeling. Further, the axis tracking unit 301 may accept the distorted object attribute. Further, the axis tracking unit 301 may train the neural network unit 202 with the object for predicting a similar category of input image data 205.

Further, each of the set of axes of the object may be tracked. It may be noted that a set of weights merged with the plurality of pixels through local convolution may help in creating multiple patterns and forming a grid for interpolation. In some embodiments, dot product summation may be performed to obtain the set of weights merged with the plurality of pixels. Further, multiple convolutions may lead to multiple outcomes. The multiple outcomes may further be transformed into a single grid or a weighted average based on regions of the object. Further, the axis tracking unit 301 may receive the set of first axes of the object. It may be noted that object position may be in a linear planar axis. Further, the axis tracking unit 301 may track the trajectory of the object based on a difference in each of a set of axes of an object between an input image and a historical image. This is explained further in conjunction with FIG. 9. Further, the process 600 may include determining, by the interpolation computation unit 302, positional axis and centroid of the object, and the interpolation for measuring the trajectory of the object, at step 605.

It may be noted that the interpolation may be calculated in three phases. Firstly, the input image data 205 may be traced to detect the object. Secondly, the set of axes may be determined for the object. The interpolation may be determined for each of the set of axes. Thirdly, difference between lattice points of the object may be determined. The third step may be performed by the axis tracking unit 301 and the interpolation computing unit 302. In some embodiments, the axis tracking unit 301 may also track a new lattice point for each of the set of axes based on difference between the new lattice point and a past lattice point. It may be noted that the new lattice point may be computed to identify the trajectory and rotational axis. Further, the rotational axis may be used by the interpolation computation unit 302 to measure distortion and other features from the system 200. Further, the difference between the new lattice point and the past lattice point of the object may be used to calculate the parity. It may be noted that the parity may determine a relationship between a past state and a present state of the object, orientation of the object, rotation of the object, etc. The parity may be used to backpropagate the trajectory of the object. This is explained further in conjunction with FIG. 10.

In an embodiment, during computation of the parity, the object state may not affect convolution prediction results. Further, the present lattice point for each of the set of first axes in the input image data 205 may be computed when the present lattice point for each of the set of first axes may not match with the past lattice point for each of the set of second axes in the historical image data. It may be noted that the parity may be one of zero or one. Further, sign conventions may be used to determine a change in lattice point position from the past state. This is further explained in conjunction with FIG. 11. It may be noted that when the lattice point position changes, interpolation values also change due to the rotational effect on the 3D Euclidean space.

Further, the process 600 may include compiling, by the parity generating unit 303, interpolated data using backpropagation of trajectory vector with the help of generated parity vector, at step 606. The parity may be used to backpropagate to the past state, detect the object, and label an attribute or a set of pixels with a category. It may be noted that the category may be used in the convolution. When the object is distorted then, the trajectory and parity values may be used to determine the environment. Further, the parity may be used to determine the past lattice point corresponding to the past state of the object and changes in each of the set of axes of the object. In some embodiments, the parity may be one of positive binary values. In such embodiments, the parity may determine a type of rotation and the past state of the object. It may be noted that the present state and the past state are determined by the SO (3) rotation group by multiplying the rotation matrix with each of the set of axes. Further, the rotation group SO (3) may use the rotation matrix to determine an axial rotation for each of the set of axes. Further, based on the parity, the past state of the object may be determined through reverse parity matching and the trajectory. The interpolation may be determined based upon the past lattice point. It may be noted that the interpolation may help to revert the object from the present state to the past state and trigger the convolution to identify the object. Further, the present state may be labeled under the category of the past state when the object may be predicted through the convolution. It may be noted that the distorted object may be trained with same category, to identify, label, and train the distorted object in the present state from the past state in a rotational environment or under spherical reflections.

Further, the process 600 may include detecting, by the interpolation computation unit 302, the object in a rotational environment and the state of the object or distorted features, at step 607. It may be noted that distorted images may be labelled based upon the object detected in the past state. Therefore, the error in prediction of distorted image may be reduced. It may be noted that training with a plurality of distorted pixels corresponding to the distorted image may include generating a plurality of convoluted pixels from the plurality of distorted pixels. Further, a convoluted grid based on the plurality of convoluted pixels may be sent to the fully connected layer 210. Further, the activation function may be used to activate the neuron for detecting and tracking the object in an input image for a particular environment, and may be carried out by employing connection protocols such as but not limited to Serial Advanced Technology Attachment (SATA), Integrated Drive Electronics (IDE), IEEE-1394, Universal Serial Bus (USB), API connect or communication between API's, fiber channel, Small Computer Systems Interface (SCSI), STD Bus, RS-232, RS-422, RS-485, I2C, SPI, Microwire, 1-Wire, IEEE 1284, Intel QuickPathInterconnect, InfiniBand, PCIe, etc., using standard data connections means such as wireless or wired.

Figure 7:
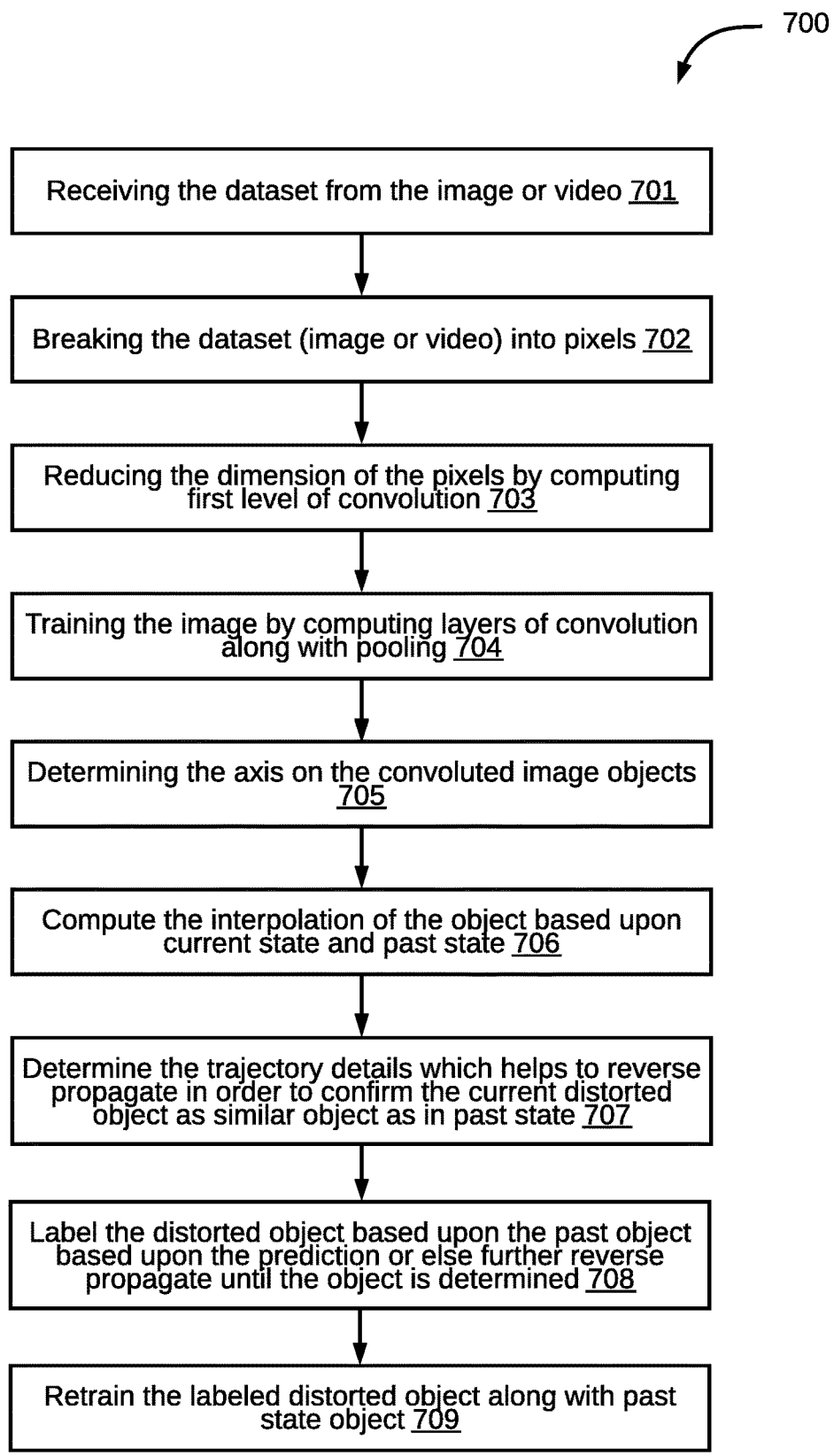
FIG. 7 is a flow diagram of another detailed exemplary process for detecting at least one object in a rotational environment, in accordance with some embodiments of the present disclosure.

Referring now to FIG. 7, a detailed exemplary process 700 for detecting at least one object in a rotational environment is depicted via a flow chart, in accordance with some embodiments of the present disclosure. The process 700 may include receiving dataset from an image or a video, at step 701. The process 700 may further include breaking the dataset (the image or the video) into pixels, at step 702. The process 700 may further include reducing the dimension of the pixels by computing first level of convolution, at step 703. Further, the process 700 may include training the image by computing layers of convolution along with pooling, at step 704. Further, the process 700 may include determining the axis on the convoluted image objects, at step 705. Further, the process 700 may include computing the interpolation of the object based upon current state and past state, at step 706. Further, the process 700 may include determining the trajectory details which helps to reverse propagate in order to confirm the current distorted object as similar object as in the past state, at step 707. Further, the process 700 may include labeling the distorted object based upon the past state object based upon the prediction or else further reverse propagate until the object is determined, at step 708. Further, the process 700 may include retraining the labeled distorted object along with past state object, at step 709.

Referring now to FIG. 8, determination of a slope for each of the set of axes based on a present lattice point, a past lattice point, and a new lattice point of an object 800 is illustrated, in accordance with some embodiments of the present disclosure. By way of an example, a slope of the object 800 along x-axis may be calculated as follows:

$$X_d = \frac{X - X_0}{X_1 - X_0} \quad (1)$$

wherein, $X_d$ is the slope;
$X_0$ is new lattice value;
X is the past lattice point; and
$X_1$ is the present lattice point.

Similarly, the slope of the object 800 may be calculated along the y-axis and the z-axis. Further, the interpolation of the object 800 along each of the set of axes may be determined. By way of an example, the interpolation along the x-axis may be determined as follows:

$$C_{00} = C_{000}(1-X_d) + C_{100}X_d \quad (2)$$

wherein, the $C_{00}$ is a function value of $(X_0, Y_0, Z_0)$

Further, the interpolation along the y-axis may be determined as follows:

$$C_0 = C_{00}(1-Y_d) + C_{10}Y_d \quad (3)$$

Further, the interpolation along the z-axis may be determined as follows:

$$C = C_0(1-Z_d) + C_1 Z_d \quad (4)$$

Further, the trajectory of the object 800 may be interpolated by determining a difference in the present state and the past state of the object 800.

Referring now to FIG. 9, determination of a difference in each of a set of axes of an object between an input image and a historical image is illustrated, in accordance with some embodiments of the present disclosure. It may be noted that the object may be in different positions (for example, positions 901a, 901b, and 901c) in different images. At position 901a, each of the set of axes 902a, 902b, and 902c may be linear. It may be noted that each of the set of axes 902a, 902b, and 902c may be initialized to zero (0) by the axis tracking unit 301, regardless of the orientation of the object in the 3D Euclidean space. Further, at position 901b, the difference between each of the set of axes 902a, 902b, and 902c, at position 901a and each of the set of axes 903a, 903b, and 903c, at position 901b may be determined by the axis tracking unit 301. It may be noted that the difference between each of the set of axes 902a, 902b, and 902c, at position 901a and each of the set of axes 903a, 903b, and 903c, at position 901b may be determined as a relative change between the position 901a and the position 901b of the object. In some embodiments, the object at position 901a may correspond to the past state and the object at position 901b may correspond to the present state. Further, the object at position 901a may be identified from the input image and the object at position 901b may be identified from the historical image. Further, the axis tracking unit 301 may calculate the trajectory and the distortion from the initialized set of axes to a final set of axes. In an exemplary scenario, when the object is in a distorted state, the locally convoluted network may determine the orientation of the object and an interpolation region based on above-mentioned method. The interpolation region may help in determining an axis boundary based on locally convoluted weights. Each of the set of axes may be presented and calibrated in the 3D Euclidean space. It may be noted that each state may be tracked or stored in a temporary instance memory while performing convolutions.

Figures 10, 11:
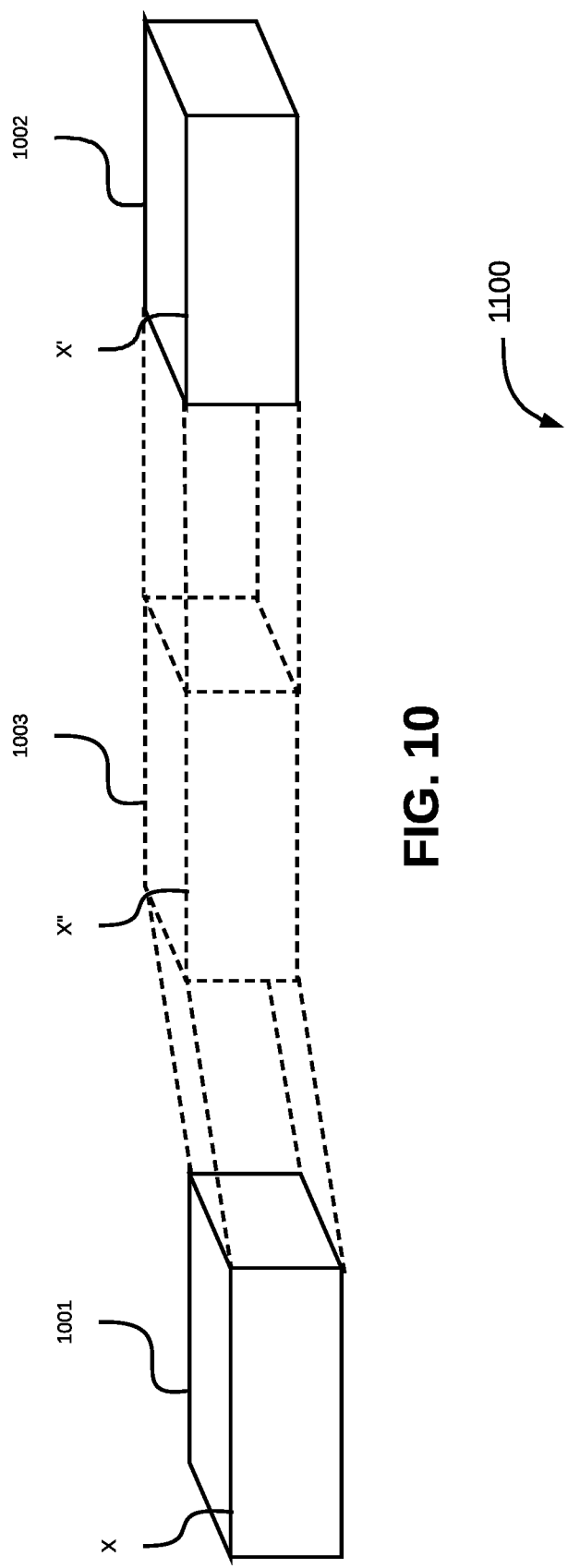
FIG. 10 illustrates determination of a trajectory of an object through interpolation between an input image and a historical image, in accordance with some embodiments of the present disclosure.
FIG. 11 is an exemplary table describing a sign convention for each of a set of states of at least one object, in accordance with some embodiments of the present disclosure.

Referring now to FIG. 10, determination of a trajectory of an object through interpolation between an input image and a historical image is illustrated, in accordance with some embodiments of the present disclosure. Based on the present state 1001 of the object in the input image and the past state 1002 of the object in the historical image, an interpolated state 1003 may be determined by the interpolation computation unit 302. It may be noted that a state of the object includes an orientation and a position of the object. Further, the interpolation may be used to define the trajectory and compute a centroid position of the object during a rotational transition from the past state 1002 to the present state 1001. The centroid position of the object may be determined based on trilinear interpolation computation along each of the set of axes (x-axis, y-axis, and z-axis). In an embodiment, at a given value of X coordinate of the present state 1001 (for example, X=10), and a given value of X coordinate of the past state 1002 (for example, X'=15), the interpolation values between X and X' may be determined. Hence, the trajectory of the object between X and X' may be identified. It may be noted that the trilinear interpolation may compute a middle state for given values of X and X' along x axis. Similarly, linear interpolation may be computed along the y-axis. Further, the linear interpolation for the z-axis may be computed by combining the result of x-axis and the y-axis. Final result of the trilinear linear interpolation computation is the centroid of the object. The centroid (for example, X") of the object may be used to form the trajectory of the object. Further, the trajectory may be used to backpropagate the object to the historic image data and identify the object to learn distorted image attributes (including lattice points). It may be noted that the backpropagation may reduce repetitive labeling and repetitive learning in the convolution.

Referring now to FIG. 11, an exemplary table describing a sign convention 1101 for each of a set of states 1102 of at least one object is illustrated, in accordance with some embodiments of the present disclosure. The table 1100 includes the sign convention 1101 and a corresponding state from the set of states 1102. Further, a different rotation matrix may be used for representing each of a clockwise and an anticlockwise rotation along each of the set of axes of the object. In some embodiments, the sign convention 1101 may be used solely for programmatical purposes. It may be noted that the interpolation may be computed based on the rotation matrix. In some embodiments, the sign convention 1101 may be used as flags. By way of an example, a sign convention "0" may correspond with an "undefined state", a sign convention "1" may correspond with a "same state", a sign convention "*1" may correspond with a "clockwise rotation", and a sign convention "%1" may correspond with an "anticlockwise rotation".

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 12:
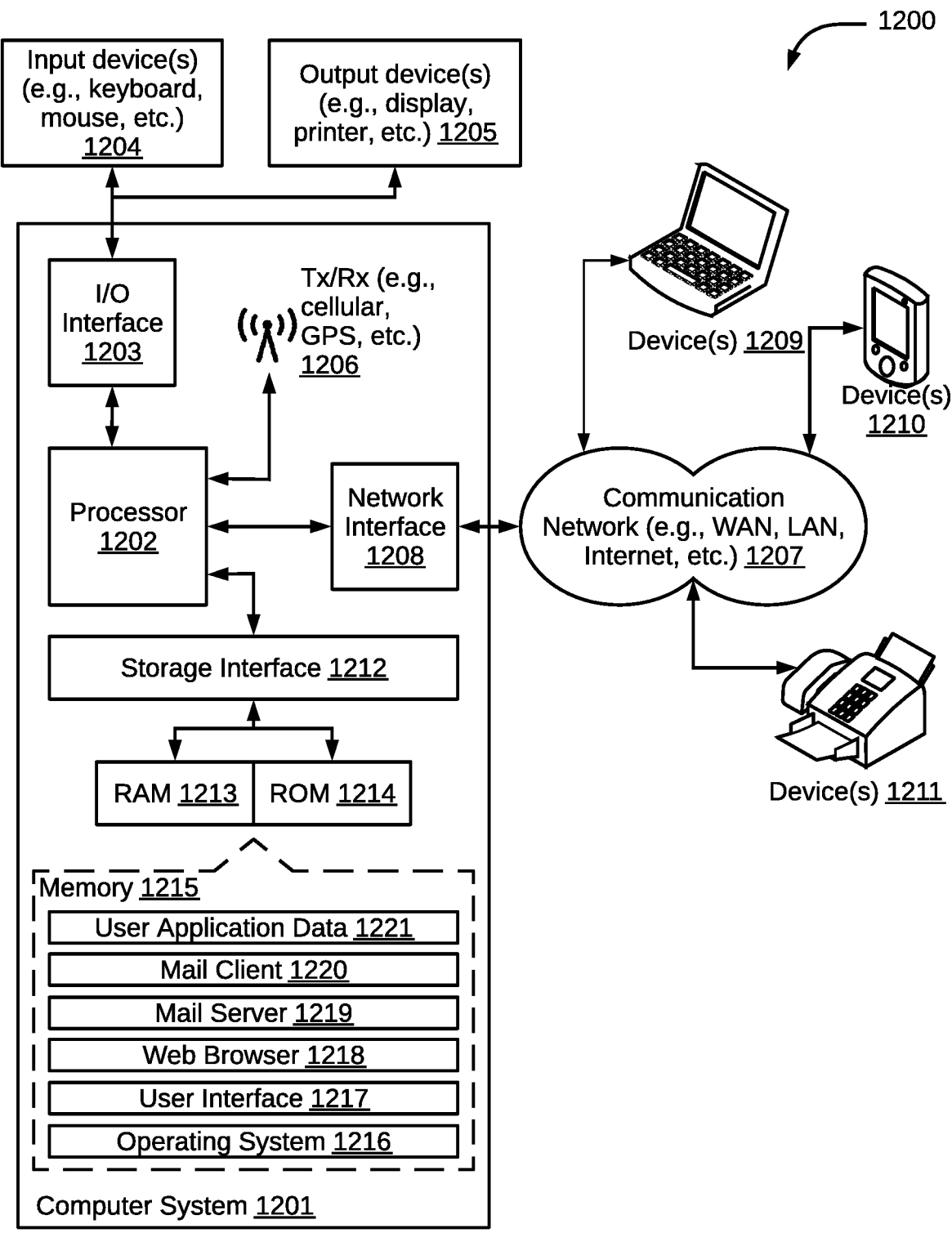
FIG. 12 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 12, a block diagram of an exemplary computer system 1201 for implementing embodiments consistent with the present disclosure is illustrated. Variations of computer system 1201 may be used for implementing system 100 for detecting at least one object in a rotational environment. Computer system 1201 may include a central processing unit ("CPU" or "processor") 1202. Processor 1202 may include at least one data processor for executing program components for executing user-generated or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1202 may be disposed in communication with one or more input/output (I/O) devices via I/O interface 1203. The I/O interface 1203 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1203, the computer system 1201 may communicate with one or more I/O devices. For example, the input device 1204 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1205 may be a printer, fax machine, video display (e.g., cathode ray tube (CRT), liquid crystal display (LCD), light-emitting diode (LED), plasma, or the like), audio speaker, etc. In some embodiments, a transceiver 1206 may be disposed in connection with the processor 1202. The transceiver 1206 may facilitate various types of wireless transmission or reception. For example, the transceiver 1206 may include an antenna operatively connected to a transceiver chip (e.g., TEXAS INSTRUMENTS® WILINK WL1286®, BROADCOM® BCM45501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1202 may be disposed in communication with a communication network 1207 via a network interface 1208. The network interface 1208 may communicate with the communication network 1207. The network interface 1208 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1207 may include, without limitation, a direct interconnection, local area network (LAN), wide area network (WAN), wireless network (e.g., using Wireless Application Protocol), the Internet, etc. Using the network interface 1208 and the communication network 1207, the computer system 1201 may communicate with devices 1209, 1210, and 1211. These devices 1209, 1210, and 1211 may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1201 may itself embody one or more of these devices 1209, 1210, and 1211.

In some embodiments, the processor 1202 may be disposed in communication with one or more memory devices (e.g., RAM 1213, ROM 1214, etc.) via a storage interface 1212. The storage interface 1212 may connect to memory devices 1215 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1215 may store a collection of program or database components, including, without limitation, an operating system 1216, user interface application 1217, web browser 1218, mail server 1219, mail client 1220, user/application data 1221 (e.g., any data variables or data records discussed in this disclosure), etc. The operating system 1216 may facilitate resource management and operation of the computer system 1201. Examples of operating systems 1216 include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1217 may facilitate display, execution, interaction, manipulation, or operation of program components through textual or graphical facilities. For example, user interfaces 1217 may provide computer interaction interface elements on a display system operatively connected to the computer system 1201, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1201 may implement a web browser 1218 stored program component. The web browser 1218 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers 1218 may utilize facilities such as AJAX®, DHTML, ADOBE® FLASH®, JAVASCRIPT®, JAVA®, application programming interfaces (APIs), etc. In some embodiments, the computer system 1201 may implement a mail server 1219 stored program component. The mail server 1219 may be an Internet mail server such as MICROSOFT® EXCHANGE®, or the like. The mail server 1219 may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server 1219 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1201 may implement a mail client 1220 stored program component. The mail client 1220 may be a mail viewing application, such as APPLE MAIL®, MICROSOFT ENTOURAGE®, MICROSOFT OUTLOOK®, MOZILLA THUNDERBIRD®, etc.

In some embodiments, computer system 1201 may store user/application data 1221, such as the data, variables, records, etc. (e.g., the input image data, the historical image data, plurality of pixels, the CNN based predictive model, set of first parameters (set of first axes, first lattice point for each of set of first axes, etc.), set of second parameters (set of second axes, second lattice point for each of the set of second axes, etc.), set of weights, weight matrix, feature matrix, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system succeed in overcoming the technical problem of detecting and tracking objects in a rotational environment. The method and system extract a set of primary features from an input image. Further, the method and system extract a set of first features from the input image data and a set of second features from a historical image data using a CNN based predictive model. Each of the set of first features and the set of second features is a convoluted feature. The predictive model may include a plurality of convoluted layers. Further, an object may be detected in the input image data based on the set of first features and in the historical image data based on the set of second features. Further, a change in each of a set of axes may be determined for the object from the historical image data to the input image data. A parity may be determined between the object of the input image data and the object of the historical image data. Further, a centroid position for the object may be determined between the input image data and the historical image data. It may be noted that the centroid position may help in determining a trajectory of the object in the rotational environment. It may also be noted that the method and system may also detect an object in a distorted state in an image.

Specifically, the claimed limitations of the present disclosure address the technical challenge by receiving a set of first features based on first data and a set of second features based on second data, detecting at least one object based on the set of first features through the CNN based predictive model, determining a set of first parameters for the at least one object, detecting the at least one object based on the set of second features through the CNN based predictive model, and determining a set of second parameters for the at least one object.

As will be appreciated by those skilled in the art, the techniques described in the various embodiments discussed above are not routine, or conventional, or well understood in the art. The techniques discussed above provide for detecting and tracking at least one object in a rotational environment. The techniques first extract a set of first features from the input image data and a set of second features from historical image data using the CNN based predictive model. The techniques may then determine a set of first parameters for the object based on the set of first features and a set of second parameters based on the set of second features. Further, the techniques may determine an interpolation of the at least one object based on the set of first parameters and the set of second parameters. The techniques may detect the at least one object in a distorted state in a rotational environment. The techniques may determine positional movements of the object using parity technique. Further, a present lattice point of the at least one object may be re-corrected using parity. Further, a navigational path of the at least one object may be determined without a sensory interface. Further, the techniques provide for automated labelling and training of the distorted object using reverse propagation.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for detecting and tracking at least one object in a rotational environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of detecting and tracking at least one object in a rotational environment, the method comprising:
   receiving, by an object detection device, a set of first features based on first data and a set of second features based on second data, wherein the first data and the second data sequentially belong to an input dataset, and wherein the input dataset comprises at least one of a plurality of images and a plurality of video frames;
   detecting, by the object detection device, at least one object based on the set of first features using a Convolutional Neural Network (CNN) based predictive model, wherein the CNN based predictive model is trained to detect and track an object;
   determining, by the object detection device, a set of first parameters for the at least one object, wherein the set of first parameters comprises a set of first axes and a first lattice point for each of the set of first axes, and wherein the set of first axes comprises at least one of a first x-axis, a first y-axis, and a first z-axis;
   detecting, by the object detection device, the at least one object based on the set of second features using the CNN based predictive model;
   determining, by the object detection device, a set of second parameters for the at least one object, wherein the set of second parameters comprises a set of second axes and a second lattice point for each of the set of second axes, and wherein the set of second axes comprises at least one of a second x-axis, a second y-axis, and a second z-axis; and
   tracking, by the object detection device, the at least one object based on the set of first parameters and the set of second parameters, wherein tracking the at least one object comprises:
      determining a parity of the at least one object based on the difference between first lattice point associated with the first data and the second lattice point associated with the second data along a common axis; and
      backpropagating the at least one object in the rotational environment based on the parity.

2. The method of claim 1, wherein tracking the at least one object further comprises:
   calculating a centroid position of the at least one object based on the first lattice point and the second lattice point along a common axis, wherein the centroid position is an interpolation of the at least one object between the first lattice point and the second lattice point;
   and
   determining a trajectory of the at least one object, through the backpropagation, based on at least one of the parity and the centroid position of the at least one object.

3. The method of claim 1, further comprising:
   transforming each of the first data and the second data into a plurality of pixels; and
   extracting a set of primary features from the plurality of pixels.

4. The method of claim 1, further comprising, at least one of:
   extracting the set of first features from the first data using the CNN based predictive model; and
   extracting the set of second features from the second data using the CNN based predictive model.

5. The method of claim 1, further comprising:
   storing a set of weights for each of a plurality of iterations of the CNN based predictive model; and
   determining a weight matrix based on the set of weights for each of the plurality of iterations of the CNN based predictive model.

6. The method of claim 5, further comprising determining an activation function based on the set of weights for each of the plurality of iterations of the CNN based predictive model.

7. The method of claim 5, further comprising classifying each of a plurality of neurons in the CNN based predictive model based on the set of weights for each of the plurality of iterations of the CNN based predictive model.

8. The method of claim 1, further comprising calculating each of the set of first axes and each of the set of second axes using Euler's rotation theorem, wherein the Euler's rotation theorem comprises multiplying a first rotation matrix of the at least one object with each of the set of first axes and multiplying a second rotation matrix of the at least one object with each of the set of second axes.

9. A system for detecting and tracking at least one object in a rotational environment, the system comprising:
   a processor; and
   a computer-readable medium communicatively coupled to the processor, wherein the computer-readable medium stores processor-executable instructions, which when executed by the processor, cause the processor to:
      receive a set of first features based on first data and a set of second features based on second data, wherein the first data and the second data sequentially belong to an input dataset, and wherein the input dataset comprises at least one of a plurality of images and a plurality of video frames;
      detect at least one object based on the set of first features using a Convolutional Neural Network (CNN) based predictive model, wherein the CNN based predictive model is trained to detect and track an object;
      determine a set of first parameters for the at least one object, wherein the set of first parameters comprises a set of first axes and a first lattice point for each of the set of first axes, and wherein the set of first axes comprises at least one of a first x-axis, a first y-axis, and a first z-axis;

detect the at least one object based on the set of second features using the CNN based predictive model;

determine a set of second parameters for the at least one object, wherein the set of second parameters comprises a set of second axes and a second lattice point for each of the set of second axes, and wherein the set of second axes comprises at least one of a second x-axis, a second y-axis, and a second z-axis; and track the at least one object based on the set of first parameters and the set of second parameters, wherein tracking the at least one object comprises:

determining a parity of the at least one object based on the difference between first lattice point associated with the first data and the second lattice point associated with the second data along a common axis; and backpropagating the at least one object in the rotational environment based on the parity.

10. The system of claim 9, wherein to track the at least one object, the processor-executable instructions, on execution, further cause the processor to:

calculate a centroid position of the at least one object based on the first lattice point and the second lattice point along a common axis, wherein the centroid position is an interpolation of the at least one object between the first lattice point and the second lattice point; and determine a trajectory of the at least one object, through the backpropagation, based on at least one of the parity and the centroid position of the at least one object.

11. The system of claim 9, wherein the processor-executable instructions, on execution, further cause the processor to:

transform each of the first data and the second data into a plurality of pixels; and extract a set of primary features from the plurality of pixels.

12. The system of claim 9, wherein the processor-executable instructions, on execution, further cause the processor to, at least one of:

extract the set of first features from the first data using the CNN based predictive model; and extract the set of second features from the second data using the CNN based predictive model.

13. The system of claim 9, wherein the processor-executable instructions, on execution, further cause the processor to:

store a set of weights for each of a plurality of iterations of the CNN based predictive model; and determine a weight matrix based on the set of weights for each of the plurality of iterations of the CNN based predictive model.

14. The system of claim 13, wherein the processor-executable instructions, on execution, further cause the processor to determine an activation function based on the set of weights for each of the plurality of iterations of the CNN based predictive model.

15. The system of claim 13, wherein the processor-executable instructions, on execution, further cause the processor to classify each of a plurality of neurons in the CNN based predictive model based on the set of weights for each of the plurality of iterations of the CNN based predictive model.

16. The system of claim 9, wherein the processor-executable instructions, on execution, further cause the processor to calculate each of the set of first axes and each of the set of second axes using Euler's rotation theorem, wherein the Euler's rotation theorem comprises multiplying a first rotation matrix of the at least one object with each of the set of first axes and multiplying a second rotation matrix of the at least one object with each of the set of second axes.

17. A non-transitory computer-readable medium storing computer-executable instructions for detecting and tracking at least one object in a rotational environment, the computer-executable instructions are executed for:

receiving a set of first features based on first data and a set of second features based on second data, wherein the first data and the second data sequentially belong to an input dataset, and wherein the input dataset comprises at least one of a plurality of images and a plurality of video frames;

detecting at least one object based on the set of first features using a Convolutional Neural Network (CNN) based predictive model, wherein the CNN based predictive model is trained to detect and track an object;

determining a set of first parameters for the at least one object, wherein the set of first parameters comprises a set of first axes and a first lattice point for each of the set of first axes, and wherein the set of first axes comprises at least one of a first x-axis, a first y-axis, and a first z-axis;

detecting the at least one object based on the set of second features using the CNN based predictive model;

determining a set of second parameters for the at least one object, wherein the set of second parameters comprises a set of second axes and a second lattice point for each of the set of second axes, and wherein the set of second axes comprises at least one of a second x-axis, a second y-axis, and a second z-axis; and tracking the at least one object based on the set of first parameters and the set of second parameters, wherein tracking the at least one object comprises:

determining a parity of the at least one object based on the difference between first lattice point associated with the first data and the second lattice point associated with the second data along a common axis; and backpropagating the at least one object in the rotational environment based on the parity.

18. The non-transitory computer-readable medium of claim 17, wherein for tracking the at least one object, the computer-executable instructions are further executed for:

calculating a centroid position of the at least one object based on the first lattice point and the second lattice point along a common axis, wherein the centroid position is an interpolation of the at least one object between the first lattice point and the second lattice point; and determining a trajectory of the at least one object, through the backpropagation, based on at least one of the parity and the centroid position of the at least one object.

19. The non-transitory computer-readable medium of claim 17, wherein the computer-executable instructions are further executed for:

transforming each of the first data and the second data into a plurality of pixels; and extracting a set of primary features from the plurality of pixels.

20. The non-transitory computer-readable medium of claim 17, wherein the computer-executable instructions are further executed for, at least one of:

extracting the set of first features from the first data using the CNN based predictive model; and extracting the set of second features from the second data using the CNN based predictive model.

* * * * *